July 10, 1945. T. TOGNOLA 2,380,203
COIL
Filed Aug. 13, 1942
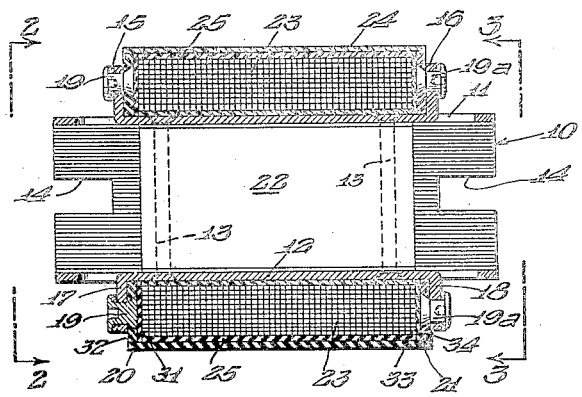
FIG. 1
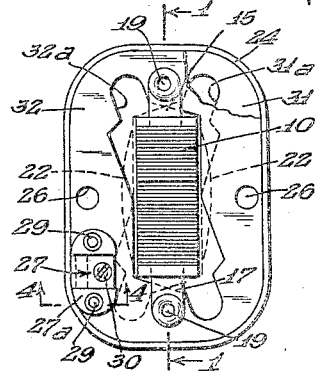
FIG. 2.
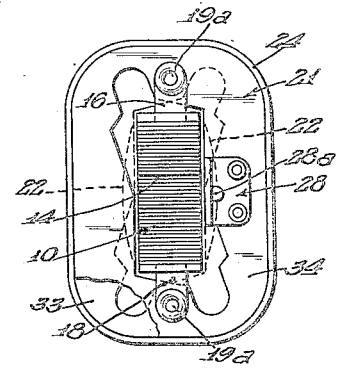
FIG. 3.
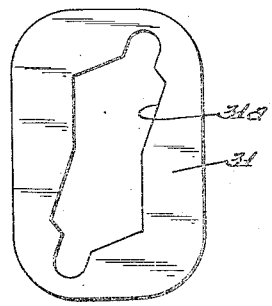
FIG. 5.
FIG. 4.
INVENTOR.
Tullio Tognola
BY F. Bascom Smith
ATTORNEY Patented July 10, 1945

2,380,203

UNITED STATES PATENT OFFICE 2,380,203

COIL

Tullio Tognola, Sidney, N. Y., assignor to Bendix Aviation Corporation, South Bend, Ind., a corporation of Delaware Application August 13, 1942, Serial No. 454,658

12 Claims. (Cl. 175—21)

This invention relates to electrical coils and more particularly to low tension coils suitable for utility in ignition current generating and distribution circuits.

One of the objects of the present invention is to provide a novel electrical coil unit having parts thereof so designed and arranged that fabrication and assembly of the unit are greatly facilitated.

Still another object is to provide a novelly constructed electrical coil which is extremely sturdy and can withstand intensive vibration and shock.

Another object is to provide means for mounting and housing the low tension coil windings, for example, of a magneto generator, said means having the end walls thereof formed and operatively positioned in a novel manner.

A further object is to provide means for operatively associating the windings and core of a coil unit, said means being constructed in a novel manner for economical fabrication and ready assembly.

Still another object is to provide a novel method for assembling a coil unit.

A still further object is to provide housing means for a coil winding which is novelly associated with the coil core.

The above and further objects and novel features of the invention will more fully appear from the following detailed description when the same is read in connection with the accompanying drawing. It is to be expressly understood, however, that the drawing is for the purpose of illustration only and is not intended to define the limits of the invention, references for this latter purpose being primarily had to the appended claims.

In the drawing, wherein like reference characters refer to like parts throughout the several views, Fig. 1 is a longitudinal sectional view of a coil unit embodying the present invention, said view being taken substantially along line 1—1 of Fig. 2;

Fig. 2 is an end elevation of said unit taken from the direction indicated by line 2—2 of Fig. 1;

Fig. 3 is a view similar to Fig. 2 taken from the direction indicated by line 3—3 of Fig. 1;

Fig. 4 is a sectional view, with parts broken away, taken substantially along line 4—4 of Fig. 2 and illustrating a terminal for the coil winding; and, Fig. 5 is an elevation of one of the novel elements comprising the housing for the coil.

Referring to Fig. 1 of the drawing, the novel coil unit is shown as comprising a core 10 of superposed metallic laminations held together between a pair of plates 11 and 12 which are secured to each other by suitable means, such as rivets 13. Plates 11 and 12 are in effect part of the core assembly 10 and may be considered as the end laminations thereof. The central laminations of said core are preferably shorter in length than the end laminations to provide a pair of grooves 14 in the ends of the assembled core whereby the mounting of the latter on the stator of a magneto is facilitated. A pair of longitudinally spaced lugs or ears 15 and 16 are formed on plate 11 adjacent the ends thereof, said ears preferably being stamped out of the plate, and a pair of similarly shaped and disposed lugs or ears 17 and 18 are provided on plate 12. As a result, lugs 15 and 16 are located directly opposite and extend away from lugs 17 and 18, respectively, and there is secured to each opposed pair of said coplanar lugs, by means of rivets 19 and 19a, one of wall members 20, 21, the latter being constructed and assembled with the core structure in a novel manner to be more fully described hereafter.

In order to prevent bending of the wire of the coil winding at right angles at the corners of core 10, filler members 22 (Figs. 1 and 2) of suitable insulating material, such as "Bakelite," are placed against each side of said core. Each of fillers 22 is preferably adhesively attached to the sides of core 10 by means of a "Bakelite" cement and the outer faces of said fillers which are adapted to engage the coil windings have a convex curvature. A coil winding 23 is wound on the above core assembly between walls 20, 21 and to enclose and further insulate the coil a tubular housing member 24 is secured to said walls, said member being preferably formed from a molded laminated phenolic tubing. The air spaces within this coil housing are preferably filled with a suitable insulating compound 25, such as polymerized cashew nut shell oil or material having similar properties, which may be introduced into the housing in liquid form through openings 26 in wall 20 (Fig. 2), said compound, when solidified, acting to bond the coil and the housing into a relatively unitary structure.

The ends of coil 23 are connected to a pair of terminals 27 and 28, which are mounted on the external faces of walls 20 and 21, respectively. Terminal 27 (Figs. 2 and 4) connects with the high potential or output end of said coil, said terminal being mounted adjacent the outer periphery of wall 20 and comprising a pair of ears 27a secured by rivets 29 to the face of wall 20 and a blocklike central section 27b. The latter has a recess or bore 27c formed therein for receiving a wire connector and a slot 27d extends through said section to said recess, the portions of said section on opposite sides of said slot being secured to each other by a screw 30 whereby said portions can be pressed together or separated in order to hold or release the connector in said recess. Terminal 28 (Fig. 3) constitutes the ground connection for the coil and consists of an angle bracket having one side thereof riveted to wall member 21 while the other side is connected to the end of the coil winding 23 at 28a.

In order to facilitate the assembly and fabrication of the above-described unit, end walls 20, 21 of the coil housing are formed in a novel manner, each of said walls being preferably of similar construction. As shown, wall 20 consists of a pair of flat, plate-like elements 31 and 32 formed from insulating material and provided with irregularly shaped openings 31a and 32a, respectively. Recess 31a (Fig. 5) is so formed that when element 31 is turned counterclockwise on core 10 from its operative position shown in Fig. 2, said element can be passed over lugs 15 and 17. In the operative position of element 31, the ends of opening 31a are displaced to one side of said lugs and solid portions of said element are adjacent the latter. End plate 32 is assembled with recess or opening 32a reversed as compared to recess 31a so that plate 32 has to be displaced in a clockwise direction from its operative position shown in Fig. 2, in order to be passed over lugs 15 and 17. As a result, when plate 32 is in normal assembled position it covers the portions of recess 31a which open into the coil housing, whereas the corresponding portions of recess 32a are covered by plate 31. Thus, when end plates 31, 32 are superposed and arranged so that recesses 31a, 32a are coincident, i. e., register with each other, said plates can be readily placed on or removed from the core assembly 10, 11, 12, whereas when said plates are angularly displaced to bring the peripheries thereof into coincidence (Fig. 2), the opening through the resulting laminated wall structure is only of sufficient area to receive core 10 and face plates 11 and 12 and the wall laminae provide a substantially solid end wall area for the housing. In this manner, elements 31 and 32 can be readily positioned on the core assembly during fabrication and, by a simple angular adjustment after passing the same over lugs 15 and 17, can be formed into wall 20 which fits relatively closely around core 10 and has solid portions adjacent lugs 15 and 17. Rivets 19 extend only through element 32, and element 31 acts to insulate the heads of said rivets from coil winding 23. Elements 33 and 34 (Fig. 3) which constitute end wall 21 are constructed and mounted on the core assembly in the same manner as elements 31 and 32, element 34 being secured to lugs 16 and 18 by rivets 19a.

There is thus provided a novel coil structure useful, for example, as the field coil of a magneto generator in an ignition circuit of the type wherein the high tension coils are disposed at points remote from the low tension generator coil. The coil unit comprises novel means for mounting and housing the coil windings, said means including wall members which may be readily fabricated and assembled in operative position on the coil. By reason of the novel construction and arrangement of the housing parts, it is possible to fabricate the parts more economically and to assemble the coil unit more rapidly than has heretofore been possible in units of like character. The novel construction comprehended also results in a simplified and yet very sturdy and durable coil structure.

Although only a single embodiment of the invention has been illustrated and described in detail, it is to be expressly understood that the same is not limited thereto. For example, the novel features of the illustrated structure may be employed in a transformer coil having both primary and secondary windings. Also, the inner laminations 31 and 33 of the end walls or flanges 20 and 21 may each be formed in two pieces, preferably halves, which may be fitted into place from opposite sides of the core to cover the desired openings in flanges 32 and 34 as well as the metallic rivets in the latter. Various changes in the arrangement and design of the parts illustrated may also be made without departing from the spirit and scope of the invention, as will now be apparent to those skilled in the art. For a definition of the limits of the invention, reference is had primarily to the appended claims.

What is claimed is:

1. An electrical coil comprising a metallic core, a plate secured to each of two opposed sides of said core, outwardly projecting spaced lugs on each of said plates, spaced wall structures surrounding said core and plates and operatively engaging the inner faces of said lugs, each of said wall structures comprising a pair of plate-like elements of insulating material, one of which is secured to the adjacent pair of said lugs, and a coil winding wound around said core and plates between said wall structures.

2. In an electrical coil, a metallic core comprising a central portion and a plate secured to each of two opposed sides of said central portion, each of said plates having spaced outwardly projecting lugs integral therewith, spaced wall structures surrounding said core and having portions attached to the inner faces of said lugs, and a coil winding around said core between said wall structures, said wall structures including insulating plate-like members interposed between said coil and the means for attaching said portions to said lugs.

3. In an electrical coil, a metallic core assembly comprising a central portion and a plate secured to each of two opposed sides of said central portion, each of said plates having outwardly projecting spaced lugs thereon, spaced wall structures surrounding said core between said lugs, each of said wall structures being constituted by a plurality of laminations, each having an opening with an uninterrupted periphery adapted to receive said core assembly including said lugs, the portion of the opening in one of said laminations for receiving said lugs being adapted to be covered by a solid portion of an adjacent lamination when the peripheries of said laminations are in coincidence, and a coil winding around said core assembly between said wall structures.

4. In an electrical coil, a metallic core assembly having laterally projecting spaced lugs extending from two opposed sides thereof, end wall structures between said lugs, and a coil winding around said core assembly between said wall structures, each of said end wall structures including a plate-like member having an opening therein through which said core assembly extends, said opening permitting limited angular movement of said member relative to said core assembly, a portion of said opening being in registry with the adjacent pair of said lugs only when said member is in a predetermined angular position relative to said core assembly.

5. In apparatus of the class described, a laminated core, the end laminations of said core having lugs formed therewith, a coil wound on said core, and an insulating housing for said coil, said housing comprising wall members secured to said lugs, each of said wall members having an opening therein, said opening being adapted to permit passage therethrough of said core including said lugs before said member is secured to said lugs and when said wall member is in a predetermined angular position relative to said core and to prevent such passage when said member is in any other angular position relative to said core.

6. In apparatus of the class described, a laminated core, the end laminations of said core having lugs secured thereto, a coil wound on said core, and a housing for said coil, said housing comprising laminated wall structures of insulating material, at least one lamina of each of said structures being secured to said lugs and at least one other lamina of each of said structures being adapted to insulate the securing means for said first-named lamina from said coil.

7. In apparatus of the class described, means comprising a core, said means including a plurality of ears arranged in two longitudinally spaced groups, a coil wound between said groups of ears, and a pair of end walls for said coil, each of said walls being secured to one of said groups of ears and comprising a pair of plate-like superposed members, the latter forming a substantially solid wall area when operatively positioned on said core, each of said members having an opening therein of sufficient area to permit said member to fit over said core and a group of said ears when angularly displaced relative to its normal position on said core.

8. A coil unit comprising a core including means serving as end plates for said core, each of said plates having lugs formed therewith, a coil wound on said core between said lugs, and a housing for said coil having substantially closed end walls, each of said walls consisting of a pair of plate-like members, the latter being recessed so as to be assembled on said core over the lugs thereon and adapted for angular adjustment to form the closed end wall area.

9. A coil unit comprising a core having a plurality of lugs secured thereto, a coil wound on said core between said lugs, and a housing for said core secured to said lugs, said housing comprising a pair of plate-like elements at each end thereof, said elements in normal position constituting a closed wall area, each covering openings in the other, said openings having uninterrupted peripheries and being shaped to permit removal of said elements over said lugs.

10. In an electrical coil, a core assembly having spaced lugs extending outwardly from two opposed sides thereof, a coil winding wound on said core between said lugs and a housing for said winding comprising a wall at each end thereof, each of said walls having component portions and being held on said core assembly by two of said lugs and each of said walls having an opening therein which registers with said core assembly including said lugs when the components of the wall are in predetermined angular positions relative to said core assembly.

11. In apparatus of the class described, means constituting a core, said means including a plurality of ears arranged in two longitudinally spaced groups, a coil wound on said core between said groups of ears, and a pair of end walls for said coil, each of said walls comprising at least a pair of plate-like superimposed members, the latter forming a substantially solid wall area around said core when operatively positioned thereon adjacent said ears, each of said members having an opening therein with an uninterrupted periphery and of suitable shape and area to permit said member to surround said core including a group of said ears when angularly displaced relative to its normal position on said core.

12. A coil unit comprising a core including means serving as end plates for said core and having lugs formed therewith, a coil wound on said core between said lugs, and a housing for said coil having substantially closed end walls, each of said walls comprising a pair of plate-like members, the latter being provided with openings having uninterrupted peripheries so as to permit assembly thereof on said core over said lugs and angular adjustment thereof relative to said core to form the closed end walls.

TULLIO TOGNOLA.